United States Patent
Ishihara et al.

(10) Patent No.: US 8,483,889 B2
(45) Date of Patent: Jul. 9, 2013

(54) SYSTEMS AND METHODS FOR SELECTIVELY ALTERING A GROUND PROXIMITY MESSAGE

(75) Inventors: Yasuo Ishihara, Kirkland, WA (US); Steve C Johnson, Issaquah, WA (US)

(73) Assignee: Honeywell International Inc., Morristown, NJ (US)

( * ) Notice: Subject to any disclaimer, the term of this patent is extended or adjusted under 35 U.S.C. 154(b) by 168 days.

(21) Appl. No.: 12/696,555

(22) Filed: Jan. 29, 2010

(65) Prior Publication Data

US 2010/0286851 A1  Nov. 11, 2010

Related U.S. Application Data

(62) Division of application No. 11/368,973, filed on Mar. 6, 2006.

(51) Int. Cl.
 *G08G 5/04* (2006.01)
(52) U.S. Cl.
 USPC ............... 701/9; 701/400; 701/414; 701/423; 701/519; 701/300; 701/301; 701/302; 340/945; 340/961
(58) Field of Classification Search
 USPC .................................................. 701/300–302
 See application file for complete search history.

(56) References Cited

U.S. PATENT DOCUMENTS

| | | | |
|---|---|---|---|
| 4,646,244 A * | 2/1987 | Bateman et al. | 701/301 |
| 4,916,448 A * | 4/1990 | Thor | 340/970 |
| 5,220,322 A * | 6/1993 | Bateman et al. | 340/970 |
| 5,657,009 A * | 8/1997 | Gordon | 340/968 |
| 5,751,289 A * | 5/1998 | Myers | 345/419 |
| 5,838,262 A * | 11/1998 | Kershner et al. | 340/945 |
| 5,839,080 A * | 11/1998 | Muller et al. | 701/9 |
| 5,892,462 A * | 4/1999 | Tran | 340/961 |
| 5,933,094 A * | 8/1999 | Goss et al. | 340/905 |
| 5,995,903 A * | 11/1999 | Smith et al. | 701/470 |
| 6,002,347 A * | 12/1999 | Daly et al. | 340/963 |
| 6,021,374 A * | 2/2000 | Wood | 701/301 |
| 6,084,989 A * | 7/2000 | Eppler | 382/293 |
| 6,122,570 A * | 9/2000 | Muller et al. | 701/9 |
| 6,138,060 A * | 10/2000 | Conner et al. | 701/9 |
| 6,201,482 B1 * | 3/2001 | Schiefele et al. | 340/961 |
| 6,346,892 B1 * | 2/2002 | DeMers et al. | 340/945 |
| 6,347,263 B1 * | 2/2002 | Johnson et al. | 701/14 |
| 6,445,310 B1 * | 9/2002 | Bateman et al. | 340/970 |
| 6,480,120 B1 * | 11/2002 | Meunier | 340/970 |
| 6,484,071 B1 * | 11/2002 | Conner et al. | 701/9 |
| 6,538,581 B2 * | 3/2003 | Cowie | 340/961 |
| 6,567,728 B1 * | 5/2003 | Kelly et al. | 701/9 |
| 6,700,482 B2 * | 3/2004 | Ververs et al. | 340/500 |

(Continued)

FOREIGN PATENT DOCUMENTS

FR  2848661  6/2004

*Primary Examiner* — Jonathan M Dager
(74) *Attorney, Agent, or Firm* — Lowe Graham Jones PLLC

(57) ABSTRACT

Systems and methods for selectively altering a ground proximity warning message. In an embodiment, a ground proximity warning system for a flight vehicle includes a processor that is configured to generate a look-ahead envelope that defines a region extending outwardly from the flight vehicle and to generate a terrain proximity message when the defined region intersects a terrain feature. An interface device is coupled to the processor that is operable to configure the system in a first operating mode wherein the generated terrain proximity message is selectively suppressed, and a second operating mode wherein the terrain proximity message is not suppressed.

15 Claims, 4 Drawing Sheets

U.S. PATENT DOCUMENTS

| | | | |
|---|---|---|---|
| 6,707,394 B2* | 3/2004 | Ishihara et al. | 340/970 |
| 6,710,723 B2* | 3/2004 | Muller et al. | 340/970 |
| 6,748,325 B1* | 6/2004 | Fujisaki | 701/301 |
| 6,804,607 B1* | 10/2004 | Wood | 701/301 |
| 6,943,701 B2* | 9/2005 | Zeineh | 340/988 |
| 7,098,809 B2* | 8/2006 | Feyereisen et al. | 340/963 |
| 7,212,216 B2* | 5/2007 | He et al. | 345/629 |
| 7,321,812 B2* | 1/2008 | Silberman et al. | 701/3 |
| 7,379,796 B2* | 5/2008 | Walsdorf et al. | 701/9 |
| 7,477,164 B1* | 1/2009 | Barber | 340/945 |
| 7,672,758 B2* | 3/2010 | Astruc | 701/16 |
| 7,747,360 B2* | 6/2010 | Canu-Chiesa et al. | 701/3 |
| 8,190,308 B2* | 5/2012 | Pitard et al. | 701/9 |
| 2002/0030610 A1* | 3/2002 | Ishihara et al. | 340/970 |
| 2002/0036574 A1* | 3/2002 | Ishihara | 340/945 |
| 2002/0069019 A1* | 6/2002 | Lin | 701/301 |
| 2002/0080145 A1* | 6/2002 | Ishihara | 345/589 |
| 2002/0097169 A1* | 7/2002 | Johnson et al. | 340/970 |
| 2002/0099478 A1* | 7/2002 | Ishihara et al. | 701/9 |
| 2003/0004641 A1* | 1/2003 | Corwin et al. | 701/301 |
| 2003/0016145 A1* | 1/2003 | Bateman | 340/967 |
| 2003/0060977 A1* | 3/2003 | Jijina et al. | 701/210 |
| 2003/0112171 A1* | 6/2003 | Michaelson et al. | 342/41 |
| 2003/0206120 A1* | 11/2003 | Ishihara et al. | 340/970 |
| 2003/0218562 A1* | 11/2003 | Orr | 342/20 |
| 2004/0030465 A1* | 2/2004 | Conner et al. | 701/16 |
| 2004/0068372 A1* | 4/2004 | Ybarra et al. | 701/301 |
| 2004/0181318 A1* | 9/2004 | Redmond et al. | 701/9 |
| 2004/0215372 A1* | 10/2004 | Bateman et al. | 701/1 |
| 2004/0225440 A1* | 11/2004 | Khatwa et al. | 701/301 |
| 2004/0239529 A1* | 12/2004 | Tran | 340/961 |
| 2005/0192739 A1* | 9/2005 | Conner et al. | 701/120 |
| 2005/0258979 A1* | 11/2005 | Artini et al. | 340/970 |
| 2005/0261808 A1* | 11/2005 | Artini et al. | 701/3 |
| 2005/0273223 A1* | 12/2005 | Artini et al. | 701/9 |
| 2006/0004497 A1* | 1/2006 | Bull | 701/10 |
| 2006/0097895 A1* | 5/2006 | Reynolds et al. | 340/961 |
| 2006/0238402 A1* | 10/2006 | Khatwa | 342/29 |
| 2009/0076728 A1* | 3/2009 | Bouchet et al. | 701/301 |

* cited by examiner

SYSTEMS AND METHODS FOR SELECTIVELY ALTERING A GROUND PROXIMITY MESSAGE

PRIORITY CLAIM

This application is a Divisional of U.S. application Ser. No. 11/368,973 (filed on Mar. 6, 2006), entitled SYSTEMS AND METHODS FOR SELECTIVELY ALTERING A GROUND PROXIMITY MESSAGE, which is incorporated by reference herein in its entirety.

BACKGROUND OF THE INVENTION

Terrain Awareness and Warning Systems (TAWS) for aircraft such as fixed wing and rotary wing vehicles have significantly contributed to the safety of flight. Briefly, and in general terms, the TAWS is operable to acquire selected flight-related information from various aircraft systems and to obtain terrain information for topological features surrounding the aircraft. The TAWS is configured to process the flight-related information and the terrain information to determine if a potential safety condition due to terrain proximity is present. If a terrain proximity hazard is determined to exist, the TAWS provides a flight crew with a suitable audible and/or visual warning that timely alerts the flight crew regarding the detected terrain hazard.

Although TAWS are generally effective in enhancing the safety of flight, drawbacks nevertheless exist. For example, in certain geographical locations, the aircraft may be intentionally operated relatively close to the surrounding terrain so that numerous terrain proximity messages are generated by the TAWS and communicated to the flight crew. In such cases, the flight crew is generally capable of maintaining sufficient visual contact with the surrounding terrain so that the aircraft may be safely navigated along a desired flight path without assistance from the TAWS. Accordingly, the numerous terrain proximity messages may constitute a nuisance that may distract the flight crew from other important flight-related tasks. Thus, in order to eliminate the undesired, or "nuisance" terrain warnings, the flight crew may deactivate the TAWS so that the nuisance messages are suppressed. An obvious shortcoming associated with deactivation of the TAWS is that an undesired terrain incursion may nevertheless occur during a temporary period of flight crew inattention to the visual monitoring of surrounding terrain.

It would therefore be desirable to provide systems and methods that permit the ground proximity messages to be selectively suppressed by the flight crew to eliminate "nuisance" messages, while desirably maintaining the considerable flight safety aspects of TAWS.

BRIEF SUMMARY OF THE INVENTION

The present invention includes systems and methods for selectively altering a ground proximity warning message. In one aspect, a ground proximity warning system for a flight vehicle includes a processor that is configured to generate a look-ahead envelope that defines a region extending outwardly from the vehicle, such as an aircraft or surface or subsurface vessel, and to generate a terrain proximity message when the defined region intersects a terrain feature. An interface device is coupled to the processor that is operable to configure the system in a first operating mode wherein the generated terrain proximity message is selectively suppressed, and a second operating mode wherein the terrain proximity message is not suppressed.

BRIEF DESCRIPTION OF THE SEVERAL VIEWS OF THE DRAWINGS

Embodiments of the present invention are described in detail below with reference to the following drawings.

DETAILED DESCRIPTION OF THE INVENTION

The present invention relates to systems and methods for selectively altering a ground proximity alert level in a Terrain Awareness and Warning Systems (TAWS). Many specific details of certain embodiments of the invention are set forth in the following description and in FIGS. 1 through 4 to provide a thorough understanding of such embodiments. One skilled in the art, however, will understand that the present invention may have additional embodiments, or that the present invention may be practiced without several of the details described in the following description. In the discussion that follows, it is understood that the term "aircraft" may apply to various flight vehicles known in the art, such as manned fixed and rotary wing aircraft, or even unmanned flight vehicles.

Figure 1:
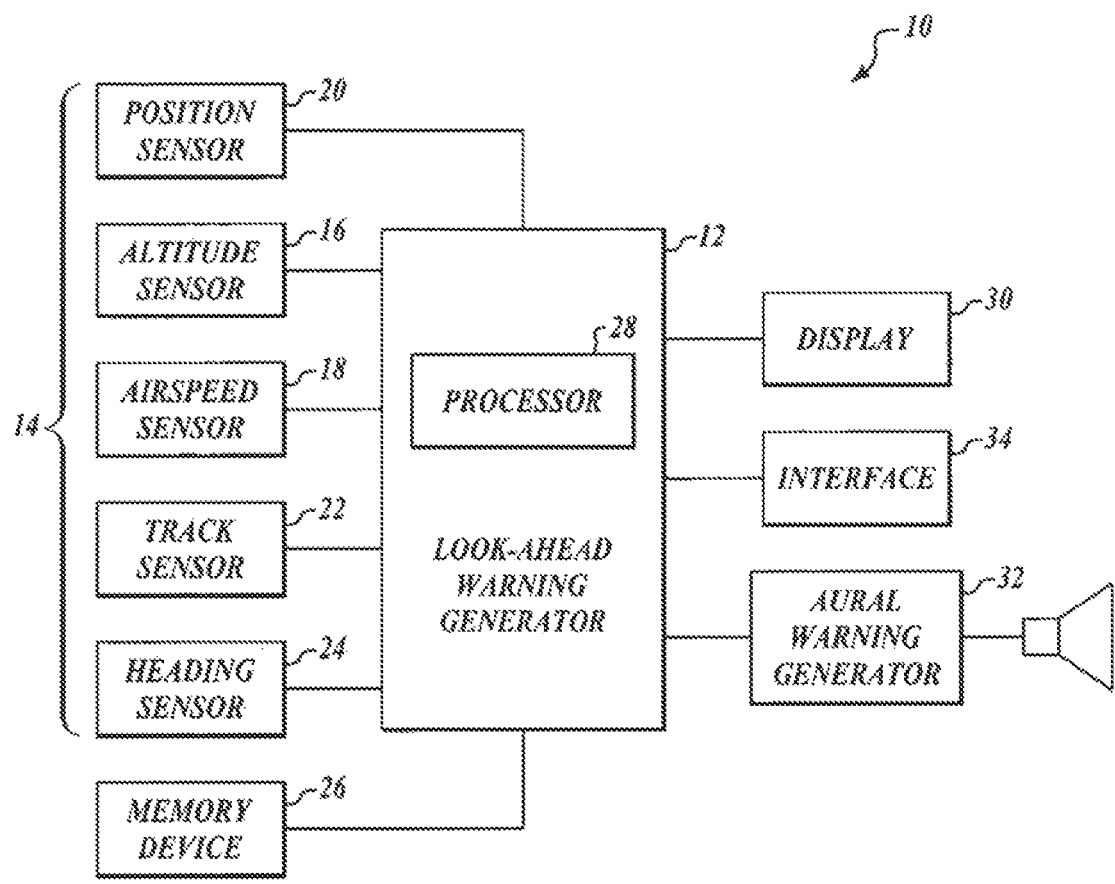
FIG. 1 is a block diagrammatic view of a system for selectively altering a ground proximity alert level for an aircraft, according to an embodiment of the invention.

FIG. 1 is a block diagrammatic view of a system 10 for selectively altering a ground proximity message for an aircraft, according to an embodiment of the invention. The system 10 includes a look-ahead warning generator 12 that is operable to receive sensor data and terrain information and to process the sensor data and terrain information to generate aural and/or visual indications related to the proximity of the aircraft to the surrounding terrain. The look ahead warning generator 12 will be discussed in greater detail below. The look-ahead warning generator 12 is operably coupled to a plurality of sensors 14 that are configured to provide selected data inputs to the look-ahead warning generator 12. For example, the sensors 14 may include an altitude sensor 16 and an airspeed sensor 18 that are configured to provide altitude and airspeed information, respectively, to the look-ahead warning generator 12. Although not shown in FIG. 1, the altitude sensor 16 and the airspeed sensor 18 may be operably coupled to an air data computer (ADC) that receives static pressure, total pressure and total air temperature information from suitable sensors positioned on the aircraft, and processes the values to generate a true airspeed, a Mach number, or other desirable operational values. The sensors 14 may also include various navigational sensors, which may include a position sensor 20, a track sensor 22 and a heading sensor 24 that cooperatively provide navigational information to the look-ahead warning generator 12. Accordingly, the navigational sensors may include a suitably configured receiver that is operable to detect navigational signals communicated to the aircraft. For example, the navigational sensors may include a global positioning system (GPS) receiver that is operable to receive navigational information from a satellite-based navigational system and process the navigational information to generate positional, track and heading values for the aircraft. Alternately, the navigational sensors may include a receiver that is configured to receive navigational information relative to a ground-based system of navigational stations, such as the known VHF Omni Range (VOR) stations, non-directional beacons (NDB) and long-range navigation (LORAN) stations.

The navigational sensors may also include other known devices that provide navigational information to the look-ahead generator 12 based upon the dynamic behavior of the aircraft. For example, the navigational sensors may include an inertial navigation system (INS) that includes one or more internal inertial-based reference sources that generate navigational information for the aircraft. Alternately, the navigational sensors may also include a flight management computer system (FMCS) that is operable to provide navigational information based upon the inertial-based reference sources, and also based upon satellite-based and/or ground-based radio navigation systems.

The system 10 also includes a memory device 26 that is suitably configured to store a searchable database that contains data pertaining to anticipated flight operations for the aircraft. Accordingly, the memory device 26 may include data that describes various geographical features and elevations of the terrain for an anticipated flight route. The memory device 26 may further include data pertaining to various man-made geographical features, such as locations, elevations and runway information for various landing sites along the anticipated flight route. The memory device 26 may further include data regarding various navigational aids (NAVAIDS) and air route intersections that may be used along the anticipated flight route, and may further include one or more "waypoint" locations, as are generally known in connection with GPS-based systems.

With continued reference to FIG. 1, the look-ahead warning generator 12 will now be described. The generator 12 includes a processor 28 that is generally operable to receive programmed instructions and data, and to process the data according to the received instructions. The processor 28 may be an integral portion of the generator 12, or it may be remotely positioned from the generator 12 and suitably and operably interconnected with the generator 12. In either case, the generator 12 receives flight-related information from the foregoing sensors 14 and also receives geographical information from the memory device 26. Based upon the received flight-related and geographical information, the generator 12 is operable to generate a look-ahead envelope that represents an outward extension from the aircraft that may be used to generate a terrain proximity message when the look-ahead envelope intersects a terrain feature. The look-ahead envelope may be further divided into a terrain advisory envelope and a terrain warning envelope that permit different proximity alarm states to be generated by the look-ahead warning generator 12. For example, when the advisory envelope intersects a terrain feature, the generator 12 provides an advisory level message to a flight crew in the aircraft. If the warning envelope intersects a terrain feature, however, a warning level message is communicated to the flight crew that generally provides an audible and a visual warning to the flight crew. The look-ahead envelope may include still other envelope configurations that provide still other messages when a terrain feature intersects the envelope. In addition, the look-ahead envelope may be configured to have any desired shape and to extend outwardly in longitudinal and lateral directions to any desired distance. Suitable look ahead envelopes are disclosed in detail in U.S. Pat. No. 5,839,080, to Muller, et al., and entitled "Terrain Awareness System", which patent is commonly owned with the present application, and is incorporated herein by reference.

A display device 30 and an aural warning generator 32 are also coupled to the look ahead warning generator 12 to communicate respective aural and visual messages to the flight crew. Accordingly, the display device 30 may include devices operable to display graphical and alphanumeric data, such as a cathode ray tube (CRT) display, and a liquid crystal display (LCD) device, although other suitable display devices may also be used. Alternately, the display device 30 may include an illumination device that is positioned to be within a field of view of the flight crew that illuminates when a suitable signal is received from the look ahead warning generator 12. The aural warning generator 32 may also include a speech synthesizer that is configured to generate an artificial representation of a human voice to communicate terrain proximity messages having speech-based content to the flight crew. Alternately, the aural warning generator 32 may be configured to emit one or more audible tones at predetermined audio frequencies that are recognizable as corresponding to a selected terrain proximity condition.

The system 10 also includes an interface device 34 that is operable to permit the flight crew to select a first operating mode, and a second operating mode for the system 10. In the first operating mode, the flight crew may selectively suppress terrain proximity messages generated by the look-ahead warning generator 12, so that an aural terrain proximity message is suppressed while a visual terrain proximity message that is displayable on the display device 30 is presented to the flight crew. Alternately, the aural terrain proximity message may be presented, while the visual terrain proximity message is suppressed. In another particular embodiment, the aural terrain proximity message and the visual terrain proximity message may be simultaneously suppressed when the first operating mode is selected. Suppression of the terrain proximity messages in the first operating mode thus advantageously allows the flight crew to selectively suppress nuisance messages that may otherwise interfere with the operation of the aircraft. For example, when the aircraft is navigated in an area where the look-ahead envelope either continuously or intermittently intersects terrain features surrounding the aircraft, the corresponding terrain proximity warnings may constitute a significant distraction to the flight crew. Although terrain proximity messages may be selectively suppressed by means of the interface device 34, it is understood that the suppression of the terrain proximity messages may be overridden by the look ahead warning generator 12 in cases where the surrounding terrain is determined to constitute a threat to the safety of flight of the aircraft. In the second operating mode, the terrain proximity massages are not suppressed, and all messages are presented to the flight crew. The interface device 34 may be manually actuated by the flight crew to suppress terrain proximity messages generated by the generator 12, or it may actuated by other means. For example, in a specific embodiment, the interface device 34 may include a speech recognition device that is operable to receive verbal commands from the flight crew to configure the system 10 in one of the first operating mode and the second operating mode.

Figure 2:
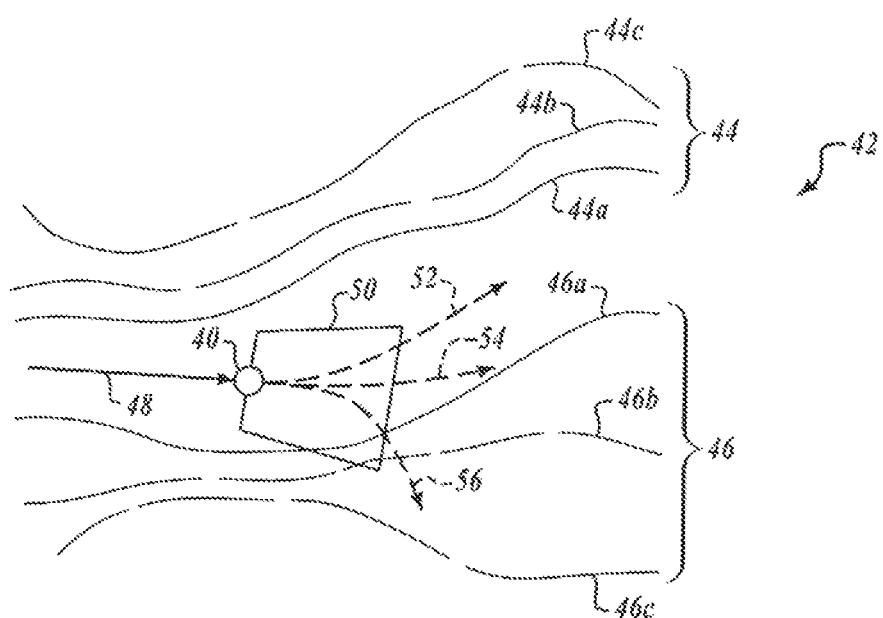
FIG. 2 is a graphical illustration of an aircraft having the system of FIG. 1 that is used to further describe the operation of the system.
Figure 2A:
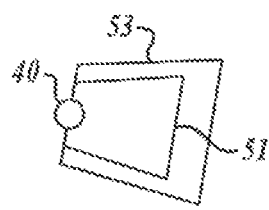

FIG. 2 is a graphical top view illustration of an aircraft 40 having the system 10 of FIG. 1 that will be used to further describe the operation of the system 10. The aircraft 40 shown in FIG. 2 navigates within a terrain structure 42 that includes first terrain features 44 positioned on a side and apart from the aircraft 40, and second terrain features 46 positioned on an opposing side of the aircraft 40 and apart from the aircraft 40.

The first terrain features 44 further include terrain contours 44a, 44b and 44c that represent relatively constant terrain elevations. The terrain contour 44a represents a terrain elevation that is less than the terrain elevation represented by terrain contour 44c. The terrain contour 44b generally corresponds to a terrain elevation that is intermediate between the elevations represented by the terrain contours 44a and 44c. Accordingly, the first terrain features 44 constitute a geographical structure having a generally upwardly increasing elevational gradient. The second terrain features 46 similarly include terrain contours 46a, 46b and 46c that also represent relatively constant terrain elevations. The terrain contour 46a represents a terrain elevation that is less than the terrain elevation represented by terrain contour 46c, while the terrain contour 46b corresponds to a terrain elevation that is intermediate between the elevations represented by the terrain contours 46a and 46c, so that the second terrain features 46 also constitute a geographical structure having a generally upwardly increasing elevational gradient.

As the aircraft 40 navigates along a ground track 48, a three-dimensional look-ahead envelope 50 that is generated by the look ahead warning generator 12 (FIG. 1) represents a volume that extends forwardly, laterally, and downwardly away from the aircraft 40. As shown in FIG. 2, the look-ahead envelope 50 intersects the second terrain features 46. Accordingly, if the system 10 in the aircraft 40 is operated in the second operational mode, a terrain proximity message will be generated by the system 10 that alerts the flight crew to the possibility of a terrain incursion if the present ground track 48 is maintained.

Still referring to FIG. 2, if the system 10 is operated in the first operational mode, the system 10 determines if alternative flight paths are available to the aircraft 40 that will avoid a terrain incursion. For example, if the aircraft 40 is steered to proceed along a first flight path 52, the aircraft 40 will avoid the terrain incursion. Similarly, the aircraft 40 may avoid the terrain incursion if the aircraft 40 is steered to proceed along a second flight path 54, or even a third flight path 56. Since the second flight path 54 and the third flight path 56 depict flight paths that would require the aircraft to navigate over terrain that exhibits an increasing elevational gradient, the determination of an alternative flight path typically also includes a determination if the aircraft 40 can execute a suitable aircraft bank angle, possesses a suitable rate of climb and/or thrust, or other pertinent performance characteristics before a flight path is accepted as a suitable alternative flight path. Although FIG. 2 illustrates only three flight paths, it is understood that as few as one, or alternately, a plurality of flight paths may be processed by the look ahead warning generator 12 to determine if the flight paths are suitable alternative flight paths.

Figure 3:
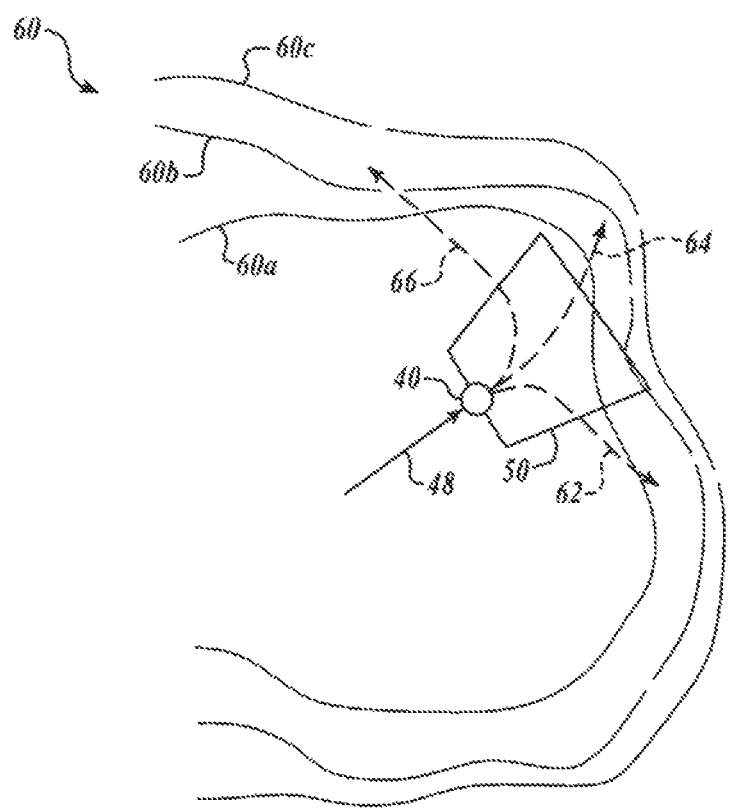
FIG. 3 is another graphical illustration of an aircraft having the system of FIG. 1 that is used to further describe the operation of the system.

Referring now to FIG. 3, the aircraft 40 having the system 10 is shown navigating within a terrain structure 60 that further includes terrain contours 60a, 60b and 60c that represent relatively constant terrain elevations, with the terrain contour 60a corresponding to an elevation that is less than a terrain elevation represented by the contour 60c. The terrain contour 60b generally corresponds to an elevation that is intermediate between the elevations represented by the contours 60a and 60c, so that the terrain structure has a generally upwardly increasing elevational gradient. As shown in FIG. 3, the look ahead envelope 50 intersects the terrain structure 60, and the system 10 accordingly determines if an alternative flight path is available to the aircraft that would avoid a terrain incursion. For example, the look ahead warning generator 12 within the system 10 may select the flight paths 62, 64 and 66 and determine if, while operating in the first operating mode, at least one of the flight paths 62, 64 and 66 will avoid a terrain incursion. If it is determined that none of the flight paths 62, 64 and 66 are suitable, then the first operating mode is overridden, and a terrain proximity message is communicated to the flight crew. Alternately, if at least one of the flight paths 62, 64 and 66 are suitable alternative flight paths, the terrain proximity message is suppressed. Although FIG. 3 illustrates three flight paths, it is understood that as few as one, or alternately, a plurality of flight paths may be processed by the look ahead warning generator 12 to determine if the flight paths are suitable alternative flight paths.

Figure 4:
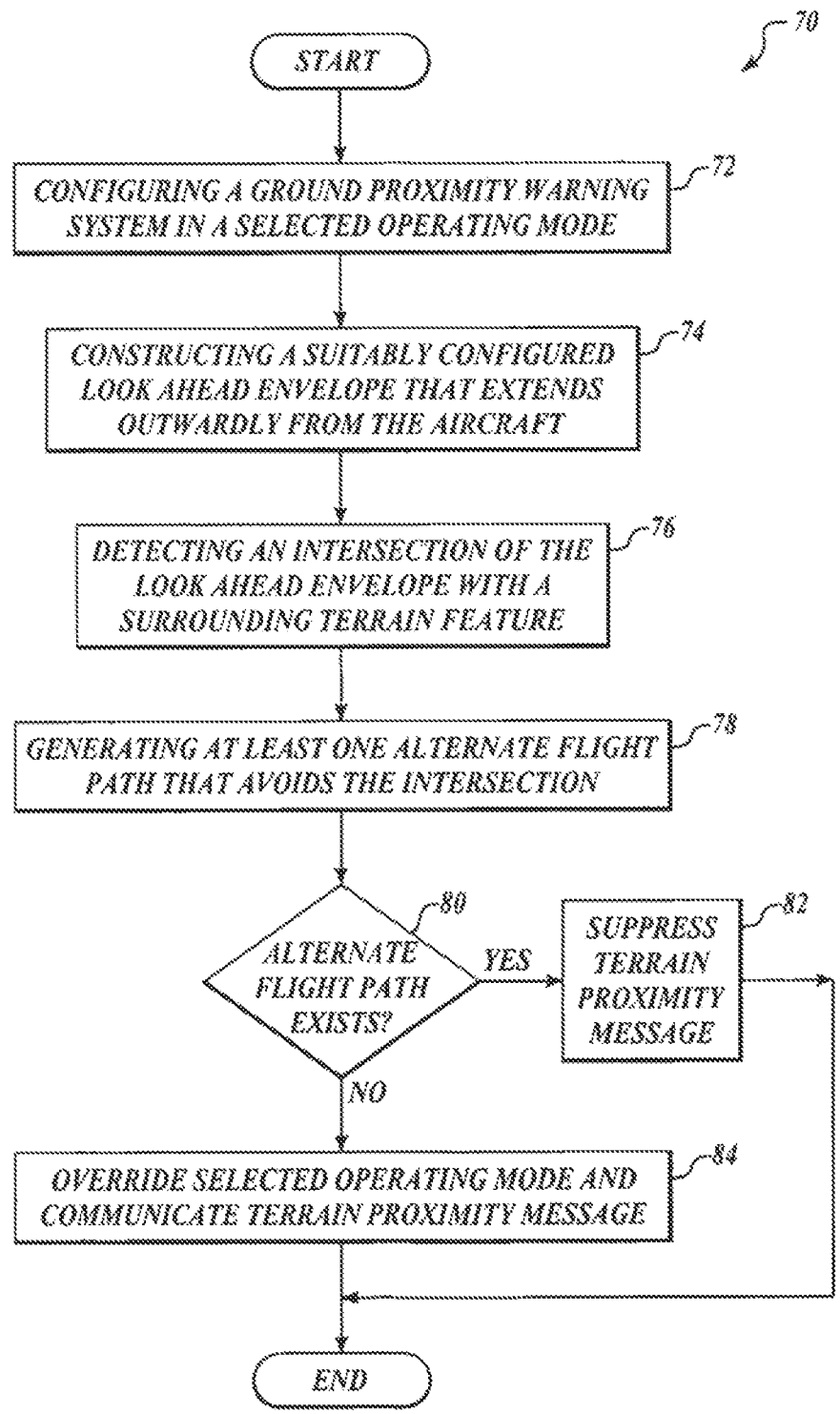
FIG. 4 is a flowchart that describes a method for selectively altering a ground proximity alert level for an aircraft, according to another embodiment of the invention.

FIG. 4 is a flowchart that will be used to describe a method 70 for selectively altering a ground proximity warning message for an aircraft, according to another embodiment of the invention. At block 72, the ground proximity warning system is configured in a selected operating mode. The selected operating mode is operable to suppress a ground proximity message generated by the system, as will be discussed in more detail below. At block 74, a suitably configured look ahead envelope is constructed by accessing terrain data stored in the memory device 26 and by receiving navigational information from the sensors 14, as shown in FIG. 1. At block 76, an intersection of the look ahead envelope with a surrounding terrain feature is detected. As explained in more detail previously, the envelope may be further subdivided into an advisory envelope and a terrain-warning envelope that permit different proximity alarm states to be generated. At block 78, the system 10 of FIG. 1 generates at least one suitable alternate flight path for the aircraft that may avoid the intersection. If the at least one alternate flight path has an advisory or warning envelope that avoids the intersection, as shown at block 80, then the terrain proximity message is suppressed (operational mode 1), as shown at block 82. Alternately, if it is determined at block 80 that no alternate flight path exists, the method 70 overrides the selected operating mode and communicates the terrain proximity message to the flight crew.

While various embodiments of the invention have been illustrated and described, as noted above, many changes can be made without departing from the spirit and scope of the invention. Accordingly, the scope of the invention is not limited by the disclosure of the various embodiments. Instead, the invention should be determined entirely by reference to the claims that follow.

The embodiments of the invention in which an exclusive property or privilege is claimed are defined as follows:

1. A method of selectively altering a ground proximity warning message for an aircraft, comprising:
   constructing a suitably configured look-ahead envelope that extends outwardly from the aircraft;
   detecting an intersection of the look-ahead envelope with a terrain feature and generating the ground proximity warning message;
   identifying at least one alternate flight path, wherein the aircraft possesses suitable performance characteristics to execute the alternate flight path to navigate;
   in response to identifying the at least one alternate flight path, continuing a first operating mode that suppresses the ground proximity warning message; and
   altering the ground proximity warning message from the suppression state if the at least one alternate flight path comprising an executable aircraft bank angle exists that avoids the intersection.

2. The method of claim 1, wherein constructing the suitably configured look-ahead envelope further comprises generating a look-ahead envelope having a terrain warning portion adjacent to the flight vehicle, and a terrain advisory portion that extends outwardly from the terrain warning portion.

3. The method of claim 2, further comprising suppressing the ground proximity warning message when the terrain advisory portion intersects the terrain feature, and presenting the ground proximity warning message when the terrain warning portion intersects the terrain feature.

4. The method of claim 1, further comprising:
determining if the aircraft possesses suitable performance characteristics to execute the aircraft bank angle to navigate along the alternate path;
generating the at least one alternate flight path only when the aircraft possesses the suitable performance characteristics to execute the aircraft bank angle.

5. The method of claim 4, wherein determining if the aircraft possesses suitable performance characteristics to navigate along the alternate path further includes determining if the aircraft possesses at least one of a suitable rate of climb and a suitable thrust.

6. The method of claim 1, wherein altering the ground proximity warning message further comprises suppressing at least one of a visual warning message and an aural warning message.

7. The method of claim 1, further comprising actuating an interface device that alters the ground proximity warning message.

8. The method of claim 7, wherein actuating an interface device further comprises actuating the interface device using at least one of a speech recognition device and a manual actuation device.

9. The method of claim 1, further comprising:
identifying from a plurality of alternate flight paths the at least one alternate flight path, wherein the alternate flight path is identified if the aircraft possesses suitable performance characteristics to execute the aircraft bank angle to navigate along the alternate path.

10. A method of selectively altering a ground proximity warning message for an aircraft, comprising:
constructing a suitably configured look-ahead envelope that extends outwardly from the aircraft;
detecting an intersection of the look-ahead envelope with a terrain feature and generating the ground proximity warning message;
identifying from a plurality of alternate flight paths at least one alternate flight path, wherein the alternate flight path is identified if the aircraft possesses suitable performance characteristics to execute at least an aircraft bank angle to navigate along the alternate flight path;
altering the ground proximity warning message if at least one alternate flight path comprising the executable aircraft bank angle exists that avoids the intersection;
in response to failure to identify the at least one alternate flight path, overriding a first operating mode that suppresses the ground proximity warning message; and
in response to overriding the first operating mode, issuing the ground proximity warning message, wherein the ground proximity warning message is altered from a suppressed state to an issued state.

11. The method of claim 10, wherein issuing the ground proximity warning message further comprises:
issuing an aural ground proximity warning message.

12. The method of claim 10, wherein issuing the ground proximity warning message further comprises:
issuing an aural ground proximity warning message and a visual ground proximity warning message.

13. A method of selectively altering a ground proximity warning message for an aircraft, comprising:
constructing a suitably configured look-ahead envelope that extends outwardly from the aircraft;
detecting an intersection of the look-ahead envelope with a terrain feature and generating the ground proximity warning message;
identifying from a plurality of alternate flight paths at least one alternate flight path, wherein the alternate flight path is identified if the aircraft possesses suitable performance characteristics to execute at least an aircraft bank angle to navigate along the alternate flight path;
in response to identifying the at least one alternate flight path, continuing a first operating mode that suppresses the ground proximity warning message; and
altering the ground proximity warning message if the at least one alternate flight path comprising the executable aircraft bank angle exists that avoids the intersection.

14. The method of claim 13, wherein continuing the first operating mode that suppresses the ground proximity warning message further comprises:
suppressing an aural ground proximity warning message; and
issuing a visual ground proximity warning message.

15. The method of claim 13, wherein continuing the first operating mode that suppresses the ground proximity warning message further comprises:
suppressing an aural ground proximity warning message and a visual ground proximity warning message.

* * * * *